E. GERBER.
MOTOR VEHICLE.
APPLICATION FILED FEB. 2, 1906.

959,851.

Patented May 31, 1910.

2 SHEETS—SHEET 1.

Witnesses:
Chas. T. Bassett
M. A. Milord

Inventor
Emanuel Gerber
By Frederick Benjamin
Atty.

E. GERBER.
MOTOR VEHICLE.
APPLICATION FILED FEB. 2, 1906.
959,851.
Patented May 31, 1910.
2 SHEETS—SHEET 2.
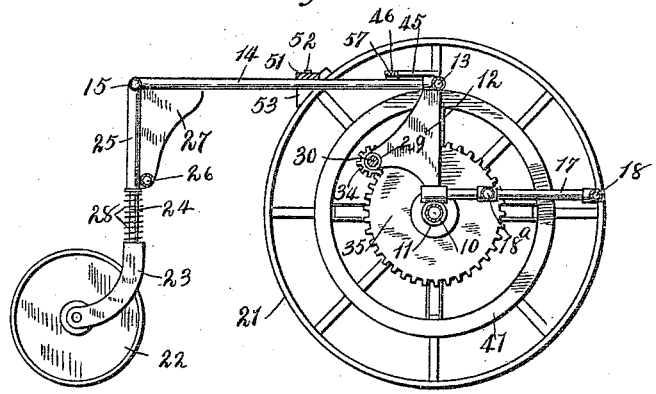
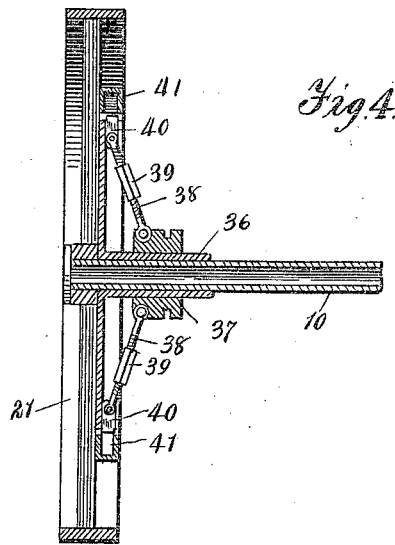
Witnesses:
Chas. F. Bassett
M. A. Milord
Inventor
Emanuel Gerber
By Frederick Benjamin
Atty.

UNITED STATES PATENT OFFICE.

EMANUEL GERBER, OF KANSAS CITY, MISSOURI.

MOTOR-VEHICLE.

959,851.  Specification of Letters Patent. Patented May 31, 1910.

Application filed February 2, 1906. Serial No. 299,120.

*To all whom it may concern:*

Be it known that I, EMANUEL GERBER, a citizen of the United States, residing at Kansas City, in the county of Jackson and State of Missouri, have invented certain new and useful Improvements in Motor-Vehicles, of which the following is a specification.

My invention relates to motor vehicles and the chief objects of the improvements which constitute the subject matter of this application are to provide a vehicle so constructed that it can be quickly and easily turned upon a center, to furnish a vehicle having two driving wheels upon the same shaft, so arranged that the said wheels may be independently rotated in either direction, or one wheel may be held at rest while the other is driven, thus permitting either end of the axle to be run forward or backward independently of the other end.

Other objects of the invention are to so construct the frame that it will be strong and rigid without requiring a great weight of material; to arrange the various levers so that they will be convenient to the position of the operator, and to provide supporting wheels in addition to the drivers that will not interfere with the free action of the latter when turning the machine, and to furnish the supporting wheels with buffer springs in order to lessen the shock of sudden jars.

A further important object of my invention is to so mount the axle upon the frame that it may be independently rotated for the purpose of driving other machinery.

I accomplish the desired results by means of the apparatus illustrated in the accompanying drawings which form a part of this application, the details of construction being disclosed in the following views:—

Figure 1:
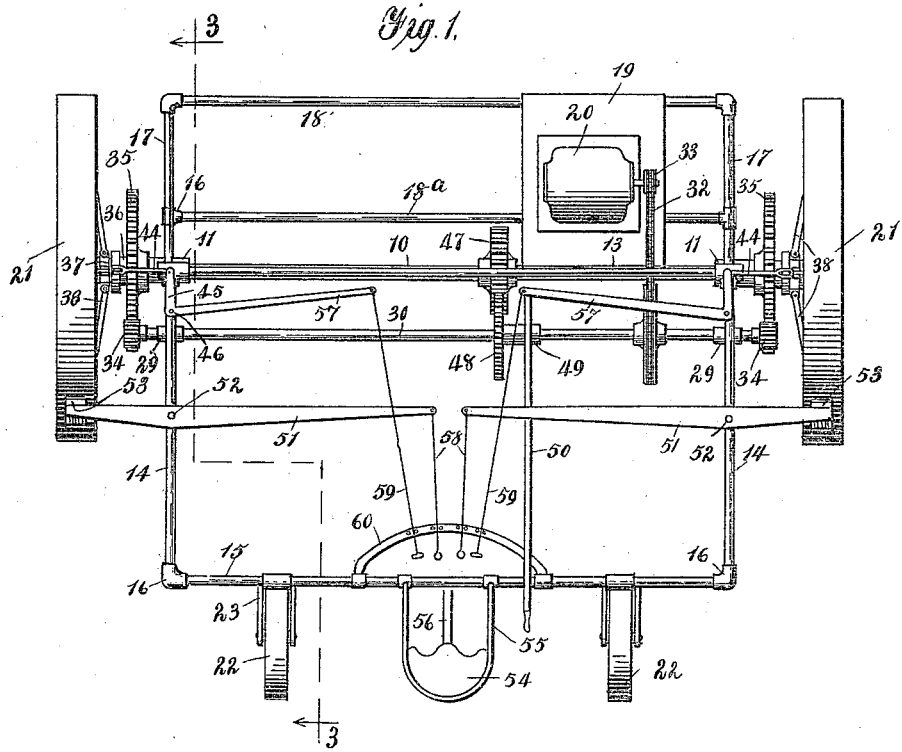
Figure 2:
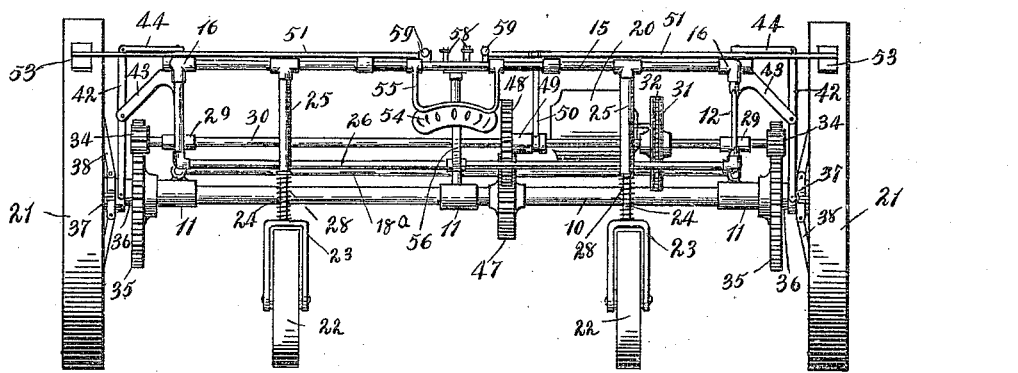

Figure 1 is a top plan view of my improved motor vehicle, with an engine mounted on the frame; Fig. 2 is a rear elevation; Fig. 3 is a sectional view on line 3—3 of Fig. 1; Fig. 4 is an enlarged sectional view of one of the driving wheels and clutch.

Referring to the details of the drawing, the numeral 10 indicates a main axle, preferably tubular in form to reduce weight, journaled in boxes 11, secured to brackets 12, the latter arranged vertically and connected at their upper ends by a member 13 extending parallel with the axle. This member 13 is tubular and forms the front side of a rectangular frame which projects backward from the said brackets, the side and rear members being designated by the numerals 14 and 15, respectively. The members of the frame are all tubular and fastened together in the usual manner by suitable couplings 16. Extending forward from said brackets 12 and at a lower level than the main rectangular frame is an auxiliary frame, comprising side members 17 and connecting members 18, 18$^a$. This frame carries a platform 19 and installed thereon is a prime mover 20 which may be a gasolene engine or motor of any desired type.

The main axle is supported by a pair of traction wheels 21, mounted loosely thereon at the opposite ends, outside of the rectangular frame. These wheels have a wide tread to adapt the machine for travel on soft ground, and receive their rotary movements from the motor in a manner hereinafter described. The main rectangular frame besides being carried at its front end upon the main axle has its rear supported by a pair of caster wheels 22, journaled in forked standards 23, having their stems 24 pivotally mounted in tubular uprights 25 secured at their upper ends to the frame member 15 and braced by a transverse tube 26 suspended from the corners of the main frame by brackets or hangers 27. Coiled springs 28, surrounding the lower part of the stems, act as buffers to prevent shocks and jars from rough roads.

The brackets 12 are extended rearwardly and furnished with boxes 29, in which is journaled a drive-shaft 30, bearing a sprocket wheel 31, driven by a chain 32 from a smaller sprocket 33 on the motor main shaft. The ends of said shaft 30 extend beyond the frame and carry pinions 34 which mesh with gears 35 mounted upon sleeves 36. A loose clutch ring 37 is slidably mounted upon said sleeve and has radially arranged arms 38 pivotally attached thereto. These arms are adjustable in length by swivel nuts 39, and are each pivotally secured at the outer end to a sliding block 40, which has frictional contact when extended with a channel ring 41 securely attached to the inner side of each traction wheel. The clutch ring 37 is operated by a vertical lever 42, pivoted to an arm 43 projecting from the adjacent bracket 12 and connected by a link 44 to the shorter arm 45 of a bell crank lever, pivoted on the side frame member 14 at 46.

Keyed upon the axle intermediate the ends is a gear wheel 47, which is operated by a gear 48 of the same diameter, carried by the shaft 30. The gear 48 is mounted on a sleeve 49, slidable upon the shaft, so that the wheels 47 and 48 may be thrown into and out of gear, a shifting lever 50 being mounted on the frame for operating said sleeve.

Provision is made for checking the movements of the driving wheels, when thrown out of gear with the engine or motor by suitable brakes comprising brake beams 51 pivoted at the points 52 on the side members 14, their outer ends being furnished with brake shoes 53, which have frictional contact with the wheel rims.

The main frame carries a seat 54 attached by springs 55, 56, to the rear frame member 15 in the median line so as to be within convenient reach of the various levers, the brake beams 51 and the long arm 57 of the bell crank levers which operate the wheel clutches, being brought within convenient reach of the operator's seat 54 by link rods 58, 59, respectively, the ends of said rods being supported upon a segment bracket 60.

The manner of operating my improved motor vehicle is as follows:—When the machine is to be used exclusively as a vehicle the axle 10 may be thrown out of gear by shifting the sleeve 49 by means of the lever 50. When it is desired to go ahead, both driving clutches are tightened by thrusting the clutch rings outwardly, or toward their respective wheels. This movement will carry the sliding blocks 40 into frictional engagement with the channel of the ring 41, thus causing both wheels to be rotated with an equal motion through the medium of the gears 34 and 35, which connect the sleeve 36 with the drive shaft 30. If, now, it is desired to turn to the right, the right hand clutch is slightly loosened, and as this will retard the motion of the driving wheel on that side, the other wheel, continuing its speed, will travel faster than its companion and thus turn the machine to the right. If the left hand clutch is now loosened and the right one tightened the vehicle will be turned in the opposite direction. If one clutch only is loosened and the brake quickly and firmly applied to that wheel the machine will spin short around upon that wheel as a center to which the brake is applied. Since the supporting wheels at the rear of the frame are built on the principle of casters they will offer no hindrance to the turning movement.

Having thus described my invention what I claim as new is:—

1. In a motor vehicle, the combination with a main frame, of an axle journaled on said frame, means connected with the motor for rotating said axle, a pair of driving wheels loosely mounted on the ends of said axle, sleeves loosely mounted upon said axle adjacent to said wheels, gears mounted upon said sleeves, friction clutches on the sleeves adapted to engage said wheels, and operative connection between said gears and the motor.

2. In a motor vehicle, the combination with a frame, of an axle journaled on said frame, means connected with the motor for rotating said axle, a pair of driving wheels loosely mounted on said axle, channel rings on said wheels, sleeves loosely mounted upon said axle adjacent to said wheels, gears mounted upon said sleeves, friction clutches slidable on said sleeves and adapted to engage said channel rings, and operative connection between said gears and the motor.

3. In a vehicle, including a motor, the combination with a frame, of an axle journaled on said frame, means connected with the motor for rotating said axle, a pair of driving wheels loosely mounted on said axle, channel rings mounted on said wheels, sleeves loosely mounted upon said axle adjacent to said wheels, gears mounted upon said sleeves, clutch rings slidable on said sleeves, radially arranged arms pivoted on said rings, friction blocks on said arms adapted to engage said channel rings, and operative connection between said gears and the motor.

4. In a motor vehicle, the combination with a frame, of an axle journaled on said frame, a drive-shaft on the frame parallel with said axle, a pair of driving wheels loosely mounted on said axle, friction clutches loosely mounted on said axle and adapted to engage said wheels, gearing connecting said clutches with said shaft, gearing connecting the shaft and said axle, and operative connection between the motor and the shaft.

In testimony whereof I affix my signature in presence of two witnesses.

EMANUEL GERBER.

Witnesses:
C. E. SCHILLER,
C. McFARLAND.